Dec. 10, 1968   G. K. NEWELL   3,415,115
RAILWAY BRAKE SHOE WITH BRAKE FORCE MEASURING MEANS
Filed Dec. 27, 1965
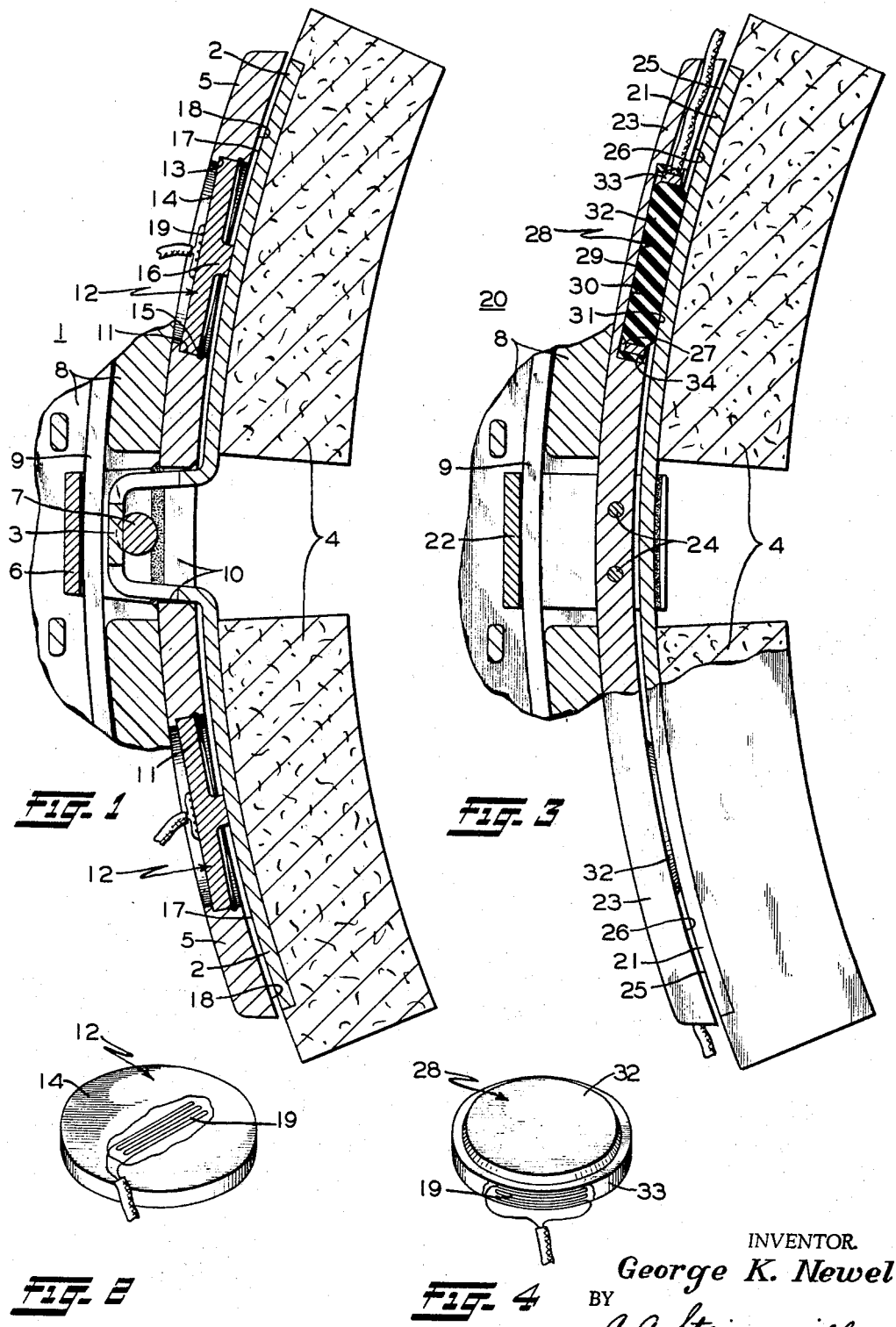
INVENTOR.
George K. Newell
BY
A. A. Steinmiller
Attorney

United States Patent Office 3,415,115
Patented Dec. 10, 1968

3,415,115
RAILWAY BRAKE SHOE WITH BRAKE FORCE MEASURING MEANS
George K. Newell, Penn Township, Westmoreland County, Pa., assignor to Westinghouse Air Brake Company, Wilmerding, Pa., a corporation of Pennsylvania
Filed Dec. 27, 1965, Ser. No. 516,547
10 Claims. (Cl. 73—121)

ABSTRACT OF THE DISCLOSURE

A brake shoe for a railway wheel comprising a pair of backing plates arranged in closely spaced parallel relation with a brake block attached to one. A load cell carried by one of the backing plates and in contact with the other backing plate transmits the force of brake application from the one to the other backing plate while being deformed under compression forces incidental to relative movement between the backing plates. A strain gage attached to the load cell reflects the distortion of the load cell as a measure of the force applying the brake shoe to the wheel.

---

Presently, the testing of railway car brake shoes and brake rigging elements is handicapped in that no means is available to determine the actual brake shoe forces on a moving vehicle. Testing is confined to static test arrangements whereby a specially constructed brake shoe is provided for engaging a mock railway wheel with a braking force in accordance with a predetermined degree of fluid under pressure supplied to a brake cylinder device to simulate a brake application. This specially constructed shoe is formed with a ball bearing disposed near each peripheral extremity of the brake shoe surface and has a strain gage attached therebetween which, when connected to an indicating device such as a potentiometer, is capable of recording or indicating the applied force at the brake shoe. The fluid pressure force applied through the brake rigging linkage to the brake head is transmitted to the center of the brake shoe with the outwardly disposed ball bearings engaging the mock wheel such that a slight bending deformity of the brake shoe is effected. As the brake shoe bends somewhat, the resulting stress therein is picked up by the strain gage, a device having an electrical characteristic which varies according to the stress, and is translated into a brake shoe force measurement.

However, in static test applications, a certain degree of fluid pressure force must be expended in overcoming the friction in the brake rigging elements before a braking force is effective at the brake shoe, which friction, it is believed, is reduced sufficiently by the vibration on a moving vehicle to materially alter the braking force existing at the brake shoe to a value other than that found by static testing.

Therefore, it is an object of this invention to provide a brake shoe device having a force measuring arrangement which functions according to the degree of stress imposed upon a deformable element thereof and which can be mounted on a standard brake head in the usual manner such that the actual brake shoe force in effect on a moving vehicle can be effectively determined under actual service braking conditions.

Other objects and advantages inherent in the invention will become apparent from the following description of the invention.

According to the present invention, a brake shoe having a strain-sensitive force measuring arrangement is provided comprising a standard backing plate and brake shoe in addition to a secondary backing plate having standard form of key bridge secured at its center and a load cell in each of two oppositely disposed recesses equidistant from, and on each side of the key bridge such that the load cells protrude somewhat from the inner peripheral surface of the secondary backing plate. The standard backing plate and brake shoe assembly is joined to the secondary backing plate and key bridge assembly such that the outer peripheral surface of the standard backing plate is maintained a slight distance from the inner peripheral surface of the secondary backing plate by reason of contact with the load cells carried therein. The key bridge is adapted to be inserted into a standard brake head, to which the joined backing plate assemblies are secured by a standard brake key passed through the brake head and key bridge in the usual manner. The load cells transmit the applied braking force to the brake shoe, which force produces a slight deformity of the load cell which imposes a stress on a strain gage consisting of a fine wire grid intimately cemented to the load cell. The electrical resistance of the wire comprising the strain gage is inversely proportional to its cross-sectional area which in turn is inversely proportional to the applied force. Thus, the resistance of the strain gage is a directly proportional function of the applied force and as such, is utilized to alter the current in an electrical circuit whereby an indicating device therein functions to provide the actual brake shoe force reading effective on the car wheel.

For a better understanding of the invention, reference may be had to the following more detailed description of the invention as illustrated by the accompanying drawings of which:

FIG. 1 is a view of a brake shoe constituting a preferred embodiment of the invention shown in cross-section;

FIG. 2 is an isometric view of the load cell incorporated in the embodiment of FIG. 1;

FIG. 3 is a view of an alternate arrangement of the invention shown partially in cross-section; and FIG. 4 is an isometric view of a modified form of load cell shown in the arrangement of FIG. 3.

Referring to FIG. 1 of the drawings, a brake shoe device 1 is illustrated and comprises a standard form of combined backing plate 2 and key bridge 3 having a brake shoe 4 secured thereto in the conventional manner. Having substantially the same curvature as backing plate 2, is a secondary backing plate 5 secured, as by welding, to a second key bridge 6 adapted to receive key bridge 3 such that the backing plates 2 and 5 are joined in near-abutting relation by a retaining pin 7 passed through the pin opening in key bridge 6 and into engagement with the underside of key bridge 3. This assemblage (combined backing plate 2 and bridge 3, brake shoe 4, secondary backing plate 5, bridge 6, and pin 7) is then secured to a standard form of brake head 8 by a brake key 9 inserted through a slot in brake head 8 and through key bridge 6 in the conventional manner.

Backing plate 5 is further formed at its center with a rectangular opening 10 therethrough about which opening key bridge 6 is secured as by welding. On opposite sides of the opening 10 and spaced equidistant therefrom is a circular recess 11 wherein a resilient disc-shaped load cell 12 is retained. Forming the base of recess 11 is an annular shoulder 13 adapted to support the load cell 12 circumferentially about the periphery of face 14 thereof, the load cell being retained in recess 11 by a snap ring 15 engaged in a groove in the circular wall of recess 11.

Bridge 3 is formed as an inverted U-shaped portion integral with backing plate 2 with an opening therethrough transverse to the backing plate assemblage.

Key bridge 6 secured about the rectangular opening 10 in backing plate 5 is likewise U-shaped, having opposing sides connected by a closed outer end, and is positioned with its opening at right angles to the opening of key bridge 3 and in alignment with the brake key passage in brake head 8 to cooperatively receive brake key 9 for securing the backing plate assemblage to the brake head 8.

The members constituting the backing plate assemblage are retained as a unit by inserting the bridge 3 through the rectangular opening 10 in backing plate 5 and into the opening provided by U-shaped key bridge 6 until backing plate 2 engages the resilient load cells 12, whereupon the backing plate assemblage is resiliently secured together in a manner to provide for a lost-motion therebetween by passing the pin 7 through a bore in the sides of bridge 6 such that a flat side provided along the length of pin 7 engages the underside of the closed end of bridge 3.

The disc-shaped load cell 12, an isometric view of which is illustratively shown in FIG. 2 of the drawings, is formed of a relatively hard resilient material which may for instance be hardened steel having such elasticity as not to exceed its elastic limit within the full range of its operation. The load cell 12 is further formed with a central protuberance 16 adapted to engage the outer peripheral surface 17 of backing plate 2 such that there exists a slight clearance between the adjacent peripheral surfaces 17 and 18 of backing plates 2 and 5 respectively. Cemented to the face 14 of load cell 12 is a grid of filament-like wire forming an electrical device known as a strain gage 19, the terminals of which are connected to an indicating device (not shown) for measuring the current in an electrical circuit according to the resistance of the strain gage 19 to thereby produce a brake shoe force reading accordingly.

In operation, when a force is applied to the brake shoe device via the brake rigging associated therewith, the force is transmitted from the brake head 8 to the secondary backing plate 5, then via the medium of the resilient load cells 12 to the backing plate 2 and brake shoe 4 which is urged accordingly into engagement with the vehicle wheel tread surface (not shown). As the brake shoe device 1 engages the wheel tread surface, backing plate 5 is urged toward backing plate 2 with a consequent reduction in the clearance space between their peripheral surfaces 17 and 18 respectively as provided for by the resilient load cells 12. It will be apparent that the applied braking force is transmitted from the annular shoulder 13 of the secondary backing plate 5 to the point contact of protuberance 16 with backing plate 2 which accordingly produces a slight bending deformity of the disc-shaped load cells 12. This bending strain of load cells 12 imposes a like strain on the wires of the attached strain gage 16 and as the wire is deformed or strained somewhat, its cross-sectional area is reduced proportionally and its resistance is varied inversely accordingly. The change in resistance of the strain gage 16 is utilized in an electrical circuit to effect a variance in the current thereof such that an indicating device also connected in the circuit functions to provide a brake shoe force reading.

In the modified construction illustrated in FIG. 3 of the drawings, a brake shoe device 20 comprises a backing plate 21 having a pair of composition brake shoe pads 4 cemented or otherwise attached in a suitable manner. Welded to the center of backing plate 21 is a key bridge 22 which provides a mount for attaching a secondary backing plate 23 by a pair of retaining pins 24 such that a slight clearance exists between the adjacent peripheral faces 25 and 26 of backing plates 21 and 23 respectively. This assemblage (backing plate 21, brake shoe sections 4, key bridge 22, and secondary backing plate 23) is positioned against a standard form brake head 8 such that brake key 9 may be inserted into a slot in the brake head 8 and through key bridge 22 in the conventional manner to retain the above-mentioned assemblage with the brake head 8 as a unit.

Backing plate 23 is further formed with oppositely disposed circular recesses 27, one on each side of the centrally located key bridge 22 and spaced equidistant therefrom. Each recess 27 carries a resilient load cell 28 in the form of a circular disc having an outer face 29 which rests on the bottom surface 30 of recess 27 and having an inner face 31 extending slightly out of the recess 27 in the backing plate 23 for engagement with the inner peripheral face 25 of backing plate 21 to maintain the clearance between the opposed adjacent peripheral faces of the two backing plates.

The resilient load cell 28 illustratively shown in FIG. 4 of the drawings, comprises a central annular core 32 of a hard compressible material such as rubber, to the outer periphery of which is bonded a surrounding annular ring 33 which may be of hardened steel having an elastic limit which exceeds the maximum bursting stress imposed on it. Cemented to the outer circumferential surface of ring 33 is a grid of filament wire forming a strain gage 19, the terminals of which are connected to an indicating or measuring device (not shown) for translating the resistance of the strain gage into a brake shoe force reading. Disposed between the periphery of recess 27 and the annular ring 33 surrounding core 32 is a bushing-like protective member 34 which separates and protects the strain gage 19 from the sidewall portion of recess 27.

The operation of the modified construction of FIG. 3 is similar to that shown in FIG. 1 of the drawings and heretofore explained except that the force applied to the brake shoe device 20 as the brake shoe pads 4 encounter the resistance offered by the wheel tread surface of a moving vehicle (not shown) effects a slight relative bending of the outer ends of the adjacent backing plates 21 and 23 within the clearance space provided therebetween to thereby render the load cells 28 effective for transmitting the applied braking force. This force effects compression of the core 32 and is resolved into an outwardly radiating force transmitted to the annular ring 33 by core 32 as it is compressed, thereby effecting expansion of ring 33 such that a stress is set up in the strain gage 19, which stress effects a variance in the resistance thereof which is read by an indicating device and translated into a brake shoe force reading as described in the operation of the previous embodiment of the invention.

Having now described the invention, what I claim as new and desire to secure by Letters Patent is:

1. A brake shoe assembly comprising:
   (a) a first backing plate carrying at least one friction pad adapted to engage a member to be braked,
   (b) a second backing plate conforming substantially in contour to said first backing plate,
   (c) means securing said backing plates together in closely spaced parallel relationship for relative movement therebetween,
   (d) a pressure-sensitive element carried by one of said backing plates and contacting the other of said backing plates, said element being deformed incidental to transmission of braking forces thereby upon application of a braking force to said second backing plate, and
   (e) an electrical means carried by the said element, and having an electrical characteristic variably responsive to deformation of said element.

2. A brake shoe assembly as claimed in claim 1 and further characterized in that said pressure-sensitive element comprises a resilient disc supported at its periphery in a conforming recess in one of said backing plates and having a central protuberance on one face thereof projecting through the space between said backing plates into contact with the other of said backing plates, said disc being thereby subject to bending strains upon application of braking forces to the assembly.

3. A brake shoe assembly as claimed in claim 2 and further characterized in that said electrical means comprises a wire grid bonded to said disc, the resistance of which varies responsive to variations in strain on the disc consequent upon variations in braking force applied to the assembly.

4. A brake shoe assembly as claimed in claim 1 and further characterized in that said means for securing said backing plates together secures the two backing plates together at a point midway of the ends thereof with a lost-motion connection to permit relative movement between the backing plates upon application of a braking force to the assembly.

5. A brake shoe assembly as claimed in claim 1 and further characterized in that said means for securing said backing plates together comprises:
   (a) a first central bridge member on said first backing plate providing an opening extending transversely of said first backing plate,
   (b) a second central bridge member on said second backing plate providing an opening longitudinally paralleling said second backing plate in which opening said first central bridge member nests at right angles thereto, and
   (c) a pin extending transversely through the opening of said second bridge member and longitudinally through the opening of the said first bridge member for securing said first bridge member within the opening of the second bridge member.

6. A brake shoe assembly as claimed in claim 5 and further characterized in that said pin is retained in said second central bridge member in securing contact with said first bridge member and moves away from engagement with said first bridge member upon application of a braking force to the second backing plate.

7. A brake shoe assembly as claimed in claim 4 and further characterized in that said pressure-sensitive element comprises a resilient disc peripherally supported in a conforming recess formed in one of said backing plates in longitudinally spaced relationship to said securing means, said disc having a central protuberance on one face thereof projecting through the space between the backing plates into contact with the other of said backing plates, said disc being subject to a bending deformation upon application of a braking force to the assembly.

8. A brake shoe assembly as claimed in claim 1 and further characterized in that said pressure-sensitive element comprises a resiliently compressible disc surrounded by a metal ring and carried in a conforming recess formed in said second backing plate in longitudinally spaced relationship with respect to said securing means, one face of said disc projecting through the space between the backing plates into contact with said first backing plate, said disc being compressed in transmitting application of braking force from said second backing plate to said first backing plate resulting in radially outward acting forces to thereby effect expansion of said ring, and said electrical means being bonded to said ring.

9. A brake shoe assembly as claim in claim 1 and further characterized in that said means for securing said backing plates together fixedly joins the two backing plates at a location between the ends thereof whereby relative bending movement between the backing plates on either side of said securing means may occur.

10. A brake shoe assembly as claimed in claim 1 and further characterized in that said means securing said backing plates together comprises:
   (a) a U-shaped bridge member straddling both of said backing plates and having an opening paralleling the backing plates, and
   (b) means fixedly securing said bridge member to the said backing plates substantially midway between the ends of the backing plate, the opening in said bridge member being adapted to receive a key for securing the brake shoe assembly to a brake head.

References Cited
UNITED STATES PATENTS

| | | | |
|---|---|---|---|
| 679,791 | 8/1901 | Stockel | 73—121 |
| 2,933,164 | 4/1960 | Baechtel | 188—243 |
| 3,139,598 | 6/1964 | Ruge | 338—4 |
| 2,885,037 | 5/1959 | Wilson | 188—251 |
| 2,117,027 | 5/1938 | Langbein | 73—341 |
| 3,321,045 | 5/1967 | Veilleux | 188—1 X |

RICHARD C. QUEISSER, *Primary Examiner.*

VICTOR J. TOTH, *Assistant Examiner.*

U.S. Cl. X.R.

73—88.5